United States Patent [19]
Bowden et al.

[11] Patent Number: 5,538,209
[45] Date of Patent: Jul. 23, 1996

[54] HARDOVER PROTECTION SYSTEM FOR AN AIRCRAFT

[75] Inventors: James M. Bowden, Lakewood; Thomas A. Cook, deceased, late of Garden Grove, by Anita D. Cook, heir; Donald L. Dailey, Irvine, all of Calif.

[73] Assignee: McDonnell Douglas Corporation, Long Beach, Calif.

[21] Appl. No.: 248,108

[22] Filed: May 24, 1994

[51] Int. Cl.⁶ .............................. B64C 13/14; G05G 5/02
[52] U.S. Cl. ...................... 244/221; 244/75 R; 244/222; 244/224; 244/232; 74/506
[58] Field of Search ..................... 244/75 R, 221, 244/222, 224, 229, 89, 231, 232; 74/480 R, 479.01, 495, 496, 506

[56] References Cited

U.S. PATENT DOCUMENTS

| | | | |
|---|---|---|---|
| 2,097,996 | 11/1937 | Butler | 244/75 R |
| 2,155,421 | 4/1939 | Kenyon et al. | |
| 2,428,150 | 9/1947 | Field, Jr. | 60/403 |
| 2,665,255 | 12/1953 | Crandall et al. | 244/224 |
| 2,685,422 | 8/1954 | Hammond et al. | 244/224 |
| 2,745,357 | 5/1956 | Strayer | 60/404 |
| 2,751,751 | 6/1956 | Strayer | 60/403 |
| 3,266,335 | 8/1966 | Wright, Jr. | 244/232 |
| 4,143,583 | 3/1979 | Bauer et al. | 60/403 |
| 4,186,622 | 2/1980 | Cooper | 244/232 |
| 4,362,067 | 12/1982 | Earl et al. | 244/76 R |
| 4,412,670 | 11/1983 | Card et al. | 60/403 |
| 4,529,155 | 7/1985 | Bramwell et al. | 244/232 |
| 4,757,684 | 7/1988 | Wright | 60/404 |
| 4,762,294 | 8/1988 | Carl | 244/75 R |
| 4,765,568 | 8/1988 | Carl et al. | 244/75 R |
| 4,876,906 | 10/1989 | Jones | 74/89.15 |

*Primary Examiner*—Andres Kashnikow
*Assistant Examiner*—Virna Lissi Mojica
*Attorney, Agent, or Firm*—Elliott N. Kramsky

[57] ABSTRACT

A hardover protection system for an aircraft. A differential motion sensor is mounted to a sector for receiving cockpit pitch commands input via a cable system. The motion sensor includes a pair of cranks held together by a predetermined spring preload. One of the cranks is coupled to a rod that forms a portion of a power linkage for hydraulically driving an elevator surface while the other is coupled to a rod that is linked to a shutoff valve. A linkage for mechanically driving an elevator control tab is also mounted to the sector. The design of the shutoff valve and its location within the aircraft's hydraulic control system interact to disable powered operation of the elevator surface upon a predetermined degree of deflection of the shutoff valve piston. Such deflection is responsive to the detection of a predetermined mismatch between the input command motion to the sector and the output motion of the power linkage. The shutoff condition is accompanied by unlocking of the manual linkage, releasing the control tab from the elevator surface and rendering its attitude directly responsive to the manual command input motion.

24 Claims, 8 Drawing Sheets

HARDOVER PROTECTION SYSTEM FOR AN AIRCRAFT

BACKGROUND

1. Field of the Invention

The present invention relates to apparatus for assuring the operation of aircraft control surfaces in the presence of recognized failure modes. More particularly, this invention pertains to apparatus for automatically switching operation of an aircraft's hydraulically-powered elevator surfaces to manual mode in the event of a recognized catastrophic failure.

2. Description of the Prior Art

The dire consequences of particular aircraft failure modes are central to Federal Aviation Administration (FAA) processes for certifying new aircraft designs. Without certification, an airliner design is not permitted to ferry civilian passengers and is therefore of little, if any, economic value. Accordingly, the inclusion of sufficient safety measures to meet FAA standards relating to all failure modes, both catastrophic and otherwise, is a necessary component of any realistic commercial airliner design.

It is recognized that the elimination of any possibility of catastrophic failure from a design is an impossibility due, in part, to the inevitable mechanical limitations of materials and components. Nevertheless, a certified design is characterized by a probability that failure modes associated with severe consequences possess extremely low probabilities. As a result, commercial air transport is considered relatively safe in terms of accidents per passenger mile.

Aircraft manufacturers must continually upgrade designs for delivery to customer airlines. Due to the competitive nature of the industry, a premium is placed upon new aircraft that most economically incorporate the latest advances in technology. Each airliner represents a substantial investment for an airline that must, in turn, restrain its own cost structure to compete successfully for cost-conscious passenger dollars.

As mentioned earlier, FAA certification usually seeks sufficiently low probabilities for catastrophic failure modes. Current FAA regulations are phrased in terms of "improbable" and "extremely improbable" occurrences where improbable is defined as one-millionth and extremely improbable is defined as one-billionth probability of an event. (Amendment 23 to FAR 25.1309(b) states: "The airplane systems and associated components, considered separately and in relation to other systems must be designed so that: (1) the occurrence of any failure condition which would prevent the continued safe flight and landing of the aircraft is extremely improbable, and (2) the occurrence of any other failure condition which would reduce the capability of the airplane or the ability of the crew to cope with adverse operating conditions is improbable.")

A common method for attaining a sufficiently low probability is through the incorporation of redundancy into the relevant system of the aircraft. By employing designs that feature redundant systems, one can take advantage of the following useful relationships of the laws of probability:

$$P_{12}(t) = P_1(t) \, P_2(t) \tag{1}$$

$$E_{12}(t) = E_1(t) \, E_2(t) \tag{2}$$

Where $P_1(t)$ is the probability of event "1" occurring within time t and $P_2(t)$ is the probability of event 2 occurring within time t where event 1 is statistically independent of event 2. $P_{12}(t)$ is then the probability of both of events 1 and 2 occurring within the same time t. Similarly, $E_1(t)$ is the expected time before occurrence of event 1 and $E_2(t)$ is the expected time before the occurrence of event 2 with $E_{12}(t)$ representing the expected time before the joint occurrence of both of the statistically independent events 1 and 2.

It is well recognized that the above relationships may be extended to any number of independent events so that each additional event effectively multiplies the probability of simultaneous occurrence, and expected time before simultaneous occurrence, of all independent events. Since probabilities less than certainty are always fractional amounts, it can be seen from equation 1 that the probability of failure of multiple independent (redundant) systems is lessened as the number of redundant systems is increased.

While redundancy offers a rather straightforward approach to many design issues, the routine addition of redundant systems to an aircraft may strain the design "budget" to the point of impracticality. Redundancy may add bulk not permitted within the available fuselage configuration. In the case of major systems such as aircraft hydraulics, associated sub-systems, reservoirs, fluid and power supplies may add significant configuration cost and weight to the point that operation becomes significantly more expensive in terms of both fuel and maintenance charges.

One well-recognized catastrophic failure mode that must be adequately provided for in any aircraft design concerns control of the elevator surfaces located in the tail section of the aircraft. Such surfaces are controlled by the interaction by a cable and pulley mechanical system, responsive to the pilot's (or autopilot's) command, and hydraulic actuators for moving the control surfaces. The hydraulic actuators are coupled to the cables through a mechanical linkage. The cable fits within a groove at the periphery of a disk-like sector.

The system for controlling the elevator surfaces, just as all aircraft systems, is subject to various failure modes. The most significant of such modes is known as "hardover". A hardover failure is characterized by the erroneous switching of a system to full command (i.e. full force). When this occurs in relation to the aircraft's elevator surfaces, control is lost and the surfaces are free to move by themselves. This condition, if unchecked, can, of course, cause the aircraft to crash.

A hardover failure of a hydraulically-powered aircraft control surface may result from a jam of the control valve spool or of the valve input arm. In the past, multiple surfaces, override valve spool sleeves and multiple single actuators have been employed to compensate for and to prevent hardovers. Such approaches either fail to protect against valve arm jams or are reliant upon all-active systems.

SUMMARY OF THE INVENTION

The present invention addresses the foregoing and other problems of the prior art by providing apparatus for operating the control surfaces of an aircraft. Such apparatus includes at least one continuous cable. A disk-like sector is provided which has a grooved periphery for receiving the cable. Means are provided for selectively imparting predetermined tension to the cable to control the angular orientation of the disk-like sector.

Means are additionally provided for hydraulically adjusting the attitude of the control surface. A first mechanical linkage is provided for transferring a change in the angular orientation of the sector to the means for hydraulically adjusting the attitude of the control surface. A second mechanical linkage is arranged to transfer the change in the angular orientation of the sector to a corresponding change in the attitude of the control surface.

Means, engaged to the sector, are provided for measuring the correlation of changes of orientation of the first mechanical linkage with changes in the angular orientation of the sector. Means, responsive to the last-named means, are provided for disabling the means for hydraulically adjusting the control surface when such correlation falls outside a predetermined limit. Finally, means, coupled to the means for disabling, are provided for locking the second mechanical linkage when the correlation falls within the predetermined limit and for unlocking the second mechanical linkage when the correlation falls outside the predetermined limit.

The preceding and additional features and advantages of the present invention will become further apparent from the detailed description that follows. Such description is accompanied by a set of drawings figures. Numerals of the drawings figures, corresponding to those of the written description, point to the features of the invention. Like numerals refer to like features throughout both the written description and the drawing figures.

DETAILED DESCRIPTION

Figure 1:
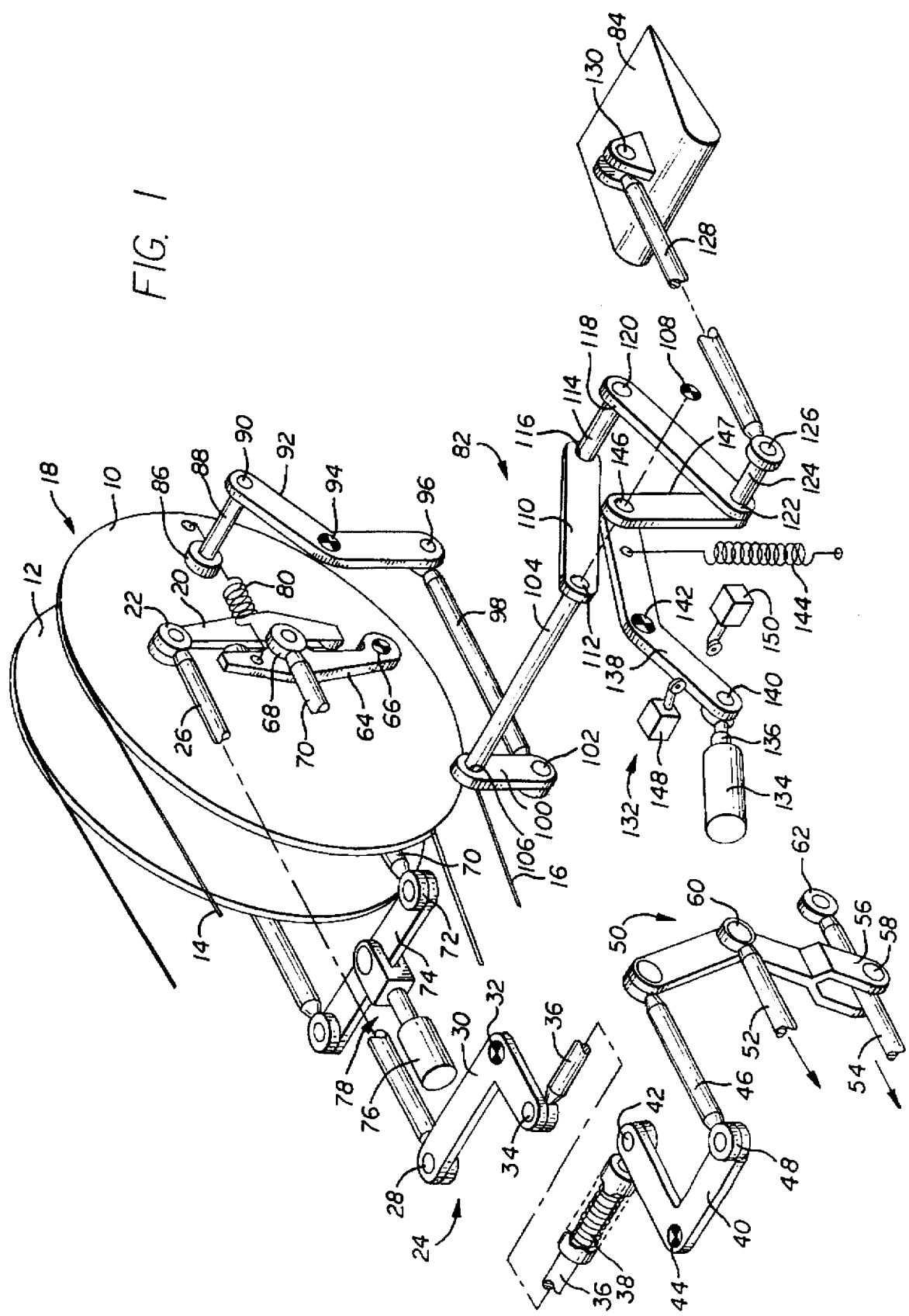
FIG. 1 is a perspective view of the hardover protection apparatus of the invention.

Turning now to the drawings, FIG. 1 is a perspective view of the hardover protection apparatus of the invention with hydraulic components and attendant linkages being shown somewhat schematically. Such apparatus includes a number of interactive functional components that continuously monitor the relationship between the input command motion (applied from the cockpit) and the resultant operation of a hydraulically powered sub-system for controlling the elevator surfaces. Upon preprogrammed detection of a failure mode in the hydraulically powered subsystem, the apparatus of the invention automatically shuts off the hydraulic system and unlocks a manually-operable backup subsystem. In combination, the two effects permit continuing control of the elevator surfaces in the presence of a failure of the hydraulically powered subsystem due, for example, to jamming of the control valve spool. In the absence of the invention, such jamming of the control valve would drive an elevator actuator cylinder to full output force and render an actuator piston for driving the elevator uncontrollable.

As mentioned earlier, a mismatch between the input motion from the cockpit and the response of the hydraulically powered elevator control system may indicate a catastrophic failure mode requiring prompt correction. Such a mismatch may be responsive to failure of redundant hydraulic systems, jamming of the control valve spool or of the valve input arm. Redundant hydraulic systems, multiple surfaces, override valve spool sleeves and multiple single actuators have been employed in the past to address this significant failure mode. These approaches do not protect against valve arm jams and are based upon active systems that are costly, complex, wasteful in terms of fuel and power and otherwise uneconomical. In contrast, the present invention provides a relatively economical and simple passive system that is sensitive to valve spool and valve arm jams and other relevant failure modes of hydraulically-powered aircraft control surfaces.

Returning to FIG. 1, a redundant pair of disk-like sectors 10 and 12 receives input motion for actuating the aircraft's elevator control surfaces through an input cable. Referring to the sector 10, cables 14 and 16 are each fixed, at one end, to the peripheral edge of the sector 10 and, at the other end, to cockpit controls. Elevator commands are thereby transferred from the cockpit by angular displacement of the sector 10. The sectors 10 and 12 are not hard-bussed together. Rather, a spring-loaded mechanism (not shown) is provided for allowing one cable to drive both sectors in the event of failure of one cable.

A differential motion detector 18 is mounted to the surface of the sector 10. (A like arrangement is mounted to the redundant sector 12.) The differential motion detector 18 includes a control valve crank 20 pivotally engaged to the center of rotation of the sector 10 and having a clevis 22 at its upper free end. The clevis 22 engages a power linkage 24 for converting angular displacement of the sector 10 into mechanical force for ultimately driving the spool of a (tandem) control valve that feeds an actuator cylinder. The cylinder drives a piston that is mechanically engaged to the aircraft's elevator surfaces.

The power linkage 24 comprises a push rod 26 that engages the clevis 22 at one end and terminates in a bearing 28 that couples to a horizontal crank 30. The crank 30 is pivoted to the aircraft body at 32. Back-and-forth motion of the push rod 26 is thereby translated to rotation of the L-shaped crank 30 in the horizontal plane (relative to the body axis system of the aircraft).

The motion transferred from the sector 10 through the push rod 26-and-crank 30 combination is coupled at the bearing 34 of the crank 30 to a push rod 36 oriented transverse to the push rod 26. Push rod 36 incorporates a preloaded spring 38. The preloaded spring acts as an override such that jams of the control valve will not stop all motion of the sector and cranks.

The axial movement of the transverse push rod 36 rotates a second horizontal crank 40, engaged to the push rod 36 at a bearing 42, about the fuselage-fixed pivot point 44. The second horizontal crank 40 is L-shaped and mounted for complementary rotation with respect to the horizontal crank 30. The remote arm of the crank 40 is engaged to a third push rod 46 (aligned transverse to the push rod 36 and parallel to the push rod 26) at a clevis 48. Input motion from the sector 10 ultimately causes rotation of the second L-shaped horizontal crank 40 to produce axial movement of the push rod 46. The axial motion of the push rod 46 is followed by a summing bar 50. An error link 52 and an elevator actuator piston rod 54 branch off from the summing bar 50. The actuator piston rod 54 is coupled to a yoke 56 at the bottom of the summing bar 50 by means of a bearing 58 while the error link 52 is coupled to an intermediate bearing 60. A joint 62 is provided at the free end of the actuator piston rod 54 for engaging an elevator-fixed horn (not shown) whereby the attitude of the aircraft elevator is responsive to the axial displacement of the actuator piston rod 54. During powered (normal) operation, axial displacement of the piston rod 54 is responsive to hydraulic inputs to an actuator cylinder (not shown in FIG. 1) from a control valve. Motion of the error link 52, which includes mechanical feedback from the piston rod 54, is input, via conventional mechanical linkages, to provide mechanical force for driving the spool of the control valve. In this way, input motion from the sector 10 is translated into hydraulically-powered operation of the attitude of the elevator control surfaces.

Returning to the differential motion sensing mechanism 18 mounted to the surface of the sector 10, a shutoff valve crank 64 which is offset with respect to the axis of rotation of the sector 10 and pivotally mounted thereto at a pivot point 66, includes a clevis 68 that engages a shutoff valve push rod 70. As will be discussed below, the clevis 68 sits at the axis of rotation of the sector 10 during normal (powered) operation of the elevator surfaces. A clevis 72 at the end of the push rod 70 engages a transverse bar 74. Back-and-forth motion of the push rod 70 generates corresponding movement of the transverse bar 74 to affect the axial position of the spool of an emergency shutoff valve 76 through a mechanical linkage represented somewhat schematically at 78. As will be seen below, the emergency shutoff valve 76 is arranged and so located within the hydraulic system of the hardover protection apparatus as to act as a switch between the powered and manual modes of elevator operation.

A spring 80 applies a predetermined degree of tension holding the crank 64 against the crank 20 as shown. The discussion that accompanies FIGS. 3(a) and 3(b) below explains how the differential motion sensor 18 continually evaluates the relationship between input motion transmitted to the sector 10 and the resultant response of the hydraulically powered portion of the system, transmitted through the power linkage 24.

A manual linkage 82 is provided for manual operation of an elevator control tab 84 should the powered subsystem experience a failure. It will be shown below that, in the event of detection of failure, power is shut off to the actuator cylinder, allowing the actuator piston (and the attached elevator surfaces) to move freely in response to aerodynamic forces generated by the manually-responsive control tab. Manual operation of the control surfaces is automatically brought on-line as soon as the programmed failure mode is sensed by the differential motion sensor 18. The manual linkage 82, locked as long as the attitude of the elevator control surfaces is hydraulically powered, is unlocked upon the detection of a failure. The details of operation of the locking mechanism are discussed in greater detail with reference to FIGS. 2(a) and 2(b) below.

Returning to FIG. 1, the manual linkage 82 includes a revolute joint 86 that is de-centered with respect to the axis of rotation of the sector 10. A tube 88 is mounted to the joint 86 and directed orthogonally with respect to the surface of the sector 10. The tube 88 terminates in a bearing 90 that engages one end of a crank 92 that is pivoted to the aircraft body at 94. A bearing 96 is mounted to the opposite end of the crank 92 for engaging one end of a push rod 98.

The remote end of the push rod 98 is joined to an upright arm 100 at a bearing 102. The opposed end of the arm 100 is fixed to a torque tube 104 at joint 106. The torque tube 104 is aligned with a fixed point 108 of the aircraft body. Rotation of the crank 92 about the pivot point 94 in response to rotation of the sector 10 is converted to angular rotation of the torque tube 104 through the linkage provided by the push rod 98 in combination with the upright arm 100.

An inclined arm 100 is fixed to the other end of the torque tube 104 at 112. This arrangement translates the above-described torsion force to rotation of the arm 110 about the fixed point 108. The remote end of the arm 110 is joined to a tube 114 at 116. The opposite end of the tube 114 is joined to a second inclined arm 118 at a bearing 120. A bearing 122 at the bottom of the arm 118 joins another tube 124 for transferring motion outwardly from the sector 10. The tube 124 is mounted to a clevis 126 of a push rod 128 whose remote end is engaged to a horn 130 of the control tab 84.

The manual linkage 82 as described above essentially converts angular rotation of the sector 10 into torsion forces that are transferred outwardly and perpendicular to the surface of the sector 10 through the various tubes, arms and cranks as described above. Such torsion induces rotation of the arm 118 about the axis of the tube 114 to produce back-and-forth movement of the push rod 138 that adjusts the attitude of the elevator control tab 84. Thus, the attitude of the control tab 84 is manually adjustable through the manual linkage 82 and does not require hydraulic power for actuation. In the manual mode, the input motion applied to the sector 10 through the cables 14 and 16 is merely extended and mechanically translated into motion of the control tab 84 without the assistance of a hydraulic power source.

The manual linkage 82 is shown in its unlocked configuration in FIG. 1 whereby the attitude of the control tab 84 is manually controllable. The apparatus for locking the manual linkage 84 will be described below and with particular reference to FIGS. 2(a) and 2(b). The locking mechanism 132 includes a tandem manual reversion cylinder 134 whose piston 136 abuts and is journalled to a crank 138 at a bearing 140. The crank 138 is pivoted to the aircraft body at 142. The remote end of the crank 138 is held down, when the mechanism 132 is in the unlocked position, by means of a spring 144. A bearing 146 is provided at the remote end of the crank 138 for connection to a locking arm 140 that is moveable in a vertical plane for locking ("up" position of the arm 147) and unlocking ("down" position of the arm 147) the manual linkage 82. A two-position switch comprising switch elements 148 and 150 is arranged to contact the remote portion of the crank 138 in accordance with its angular orientation about the pivot point 142. The angular attitude of the crank 138 indicates the state—locked or unlocked—of the manual linkage 82. The switch thus provides a signal to the cockpit that advises the crew of the locking or unlocking of the manual linkage 82 and the crew is therefore immediately aware of any switchover of elevator control from powered to manual mode.

Figure 2A:
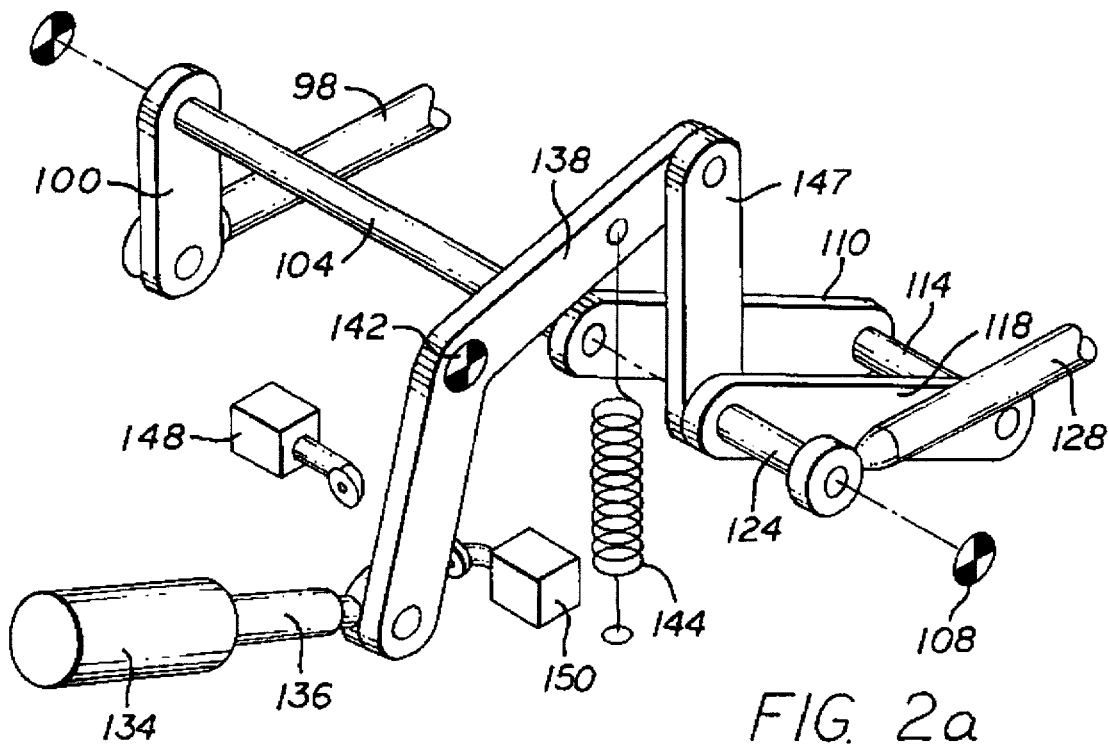
FIGS. 2(a) and 2(b) are perspective views that detail the mechanism of the invention for manually controlling the elevator surfaces shown in locked and unlocked configurations respectively.
Figure 2B:
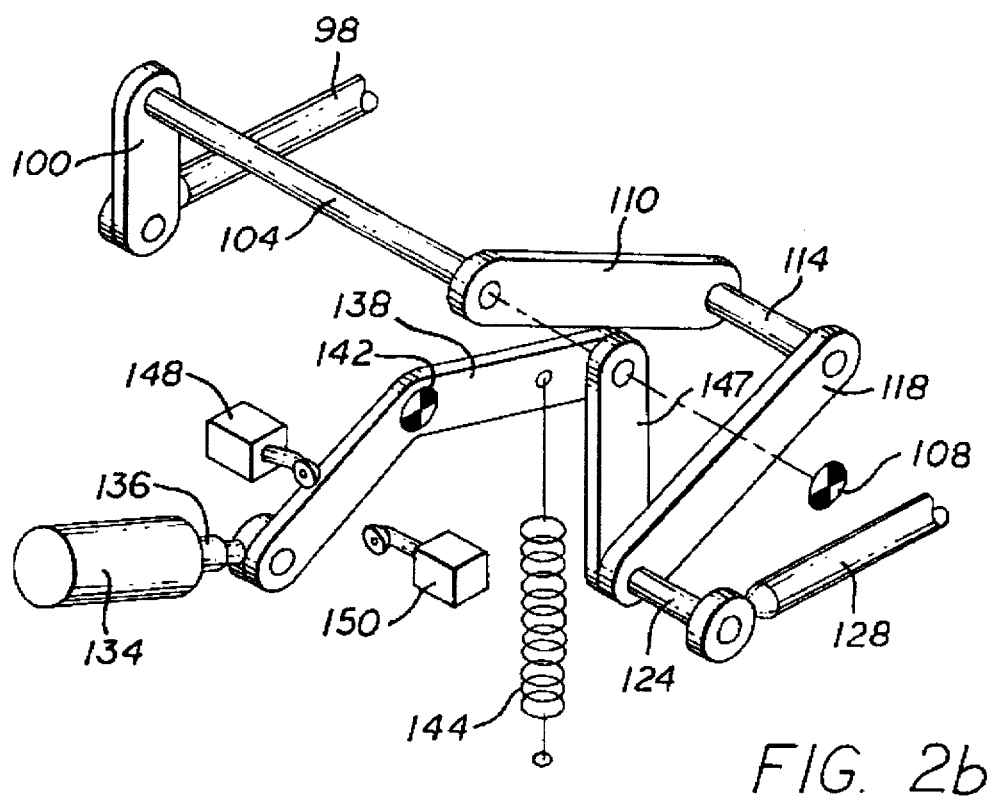

FIGS. 2(a) and 2(b) are broken partial perspective views of the manual linkage 82 with particular emphasis upon the mechanical operation of the locking mechanism 132. The linkage is shown locked and unlocked, respectively, in the figures. Referring to the locked position of FIG. 2(a), the piston 136 of the manual reversion cylinder 134 is extended. As a result, the piston 136, which abuts and is fixed to the bearing 140 at the near end of the crank 138, will rotate the crank 138 counterclockwise about the crank pivot point 142 from the position shown in FIG. 1. This raises the remote end of the crank 138 and elevates the vertical arm 147 of the locking mechanism 132. Rotation of the crank 138 in response to force exerted by the piston 136 upon the bearing 140 overcomes the predetermined holddown force exerted by the spring 144 upon the remote arm of the crank 138 and results in the crank 138, in turn, exerting a compressive force upon the end of the piston 136.

By raising the remote end of the crank 138, the arm 110 is lifted to align the axis of rotation of the tube 124 with that of the torque tube 104 (which, as mentioned earlier, is aligned with the fixed point 108 of the aircraft body). Such alignment of the tubes 104 and 124 renders the arms 110 and 118 parallel. In this configuration of the manual linkage 82, the tubes 104 and 124 function as a single element with an attendant loss of leverage that prevents translation of rotation of the sector 10 into angular rotation of the arm 118. The subassembly comprising the parallel inclined arms 110 and 118 is mechanically disabled and unable to exert any force to position the control tab 84. Accordingly, the push rod is unaffected by rotation of the sector 10.

In contrast, the unlocked position illustrated in FIG. 2(b) results from the retraction of the piston 136 of the manual reversion cylinder 134. This produces a clockwise rotation of the crank 138 about the pivot point 142 that is imparted by the downward-acting force of the spring 144 upon the remote end of the crank 138. This clockwise rotation lowers the vertical arm 147, rotating the arm 118 counterclockwise about the tube 114 and removing the tube 124 from axial alignment with the tube 104.

Once the tubes 104 and 124 are no longer aligned, they no longer act as a single element. The arms 110 and 118 are no longer parallel to one another and the manual linkage 82 now possesses the necessary leverage for moving the push rod 128. With the arm 118 now responsive to rotation of the tube 114, the position of the tube 124 will react to rotation of the sector 10, allowing manual control of the push rod 128.

Figure 3A:
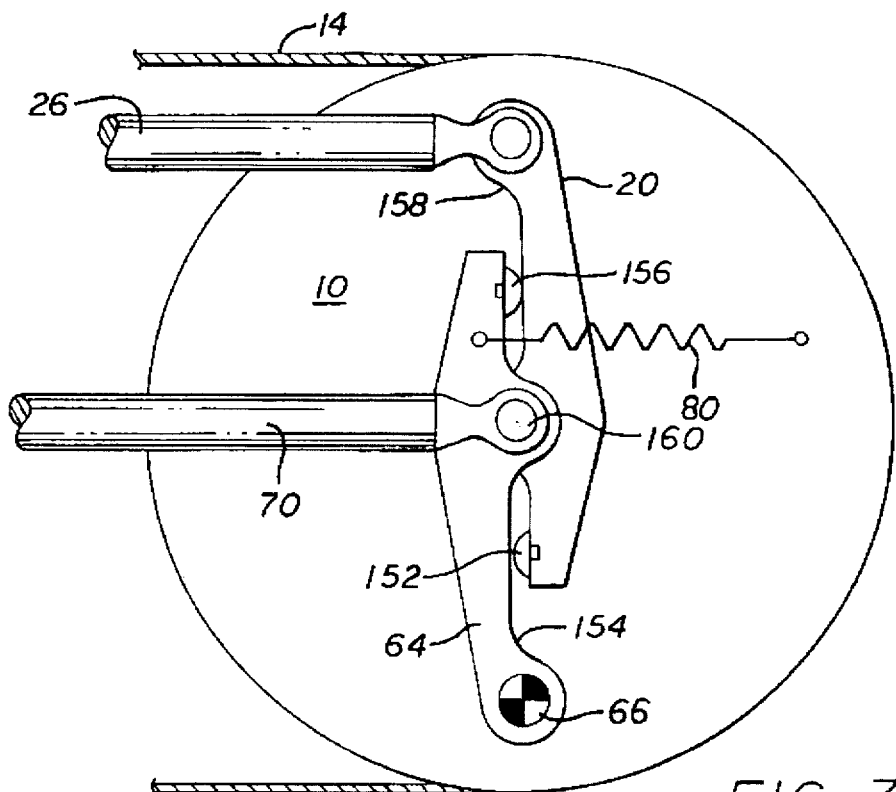
FIGS. 3(a) and 3(b) are side elevation views of the differential motion sensing mechanism of the invention in the normal and shutoff modes respectively.
Figure 3B:
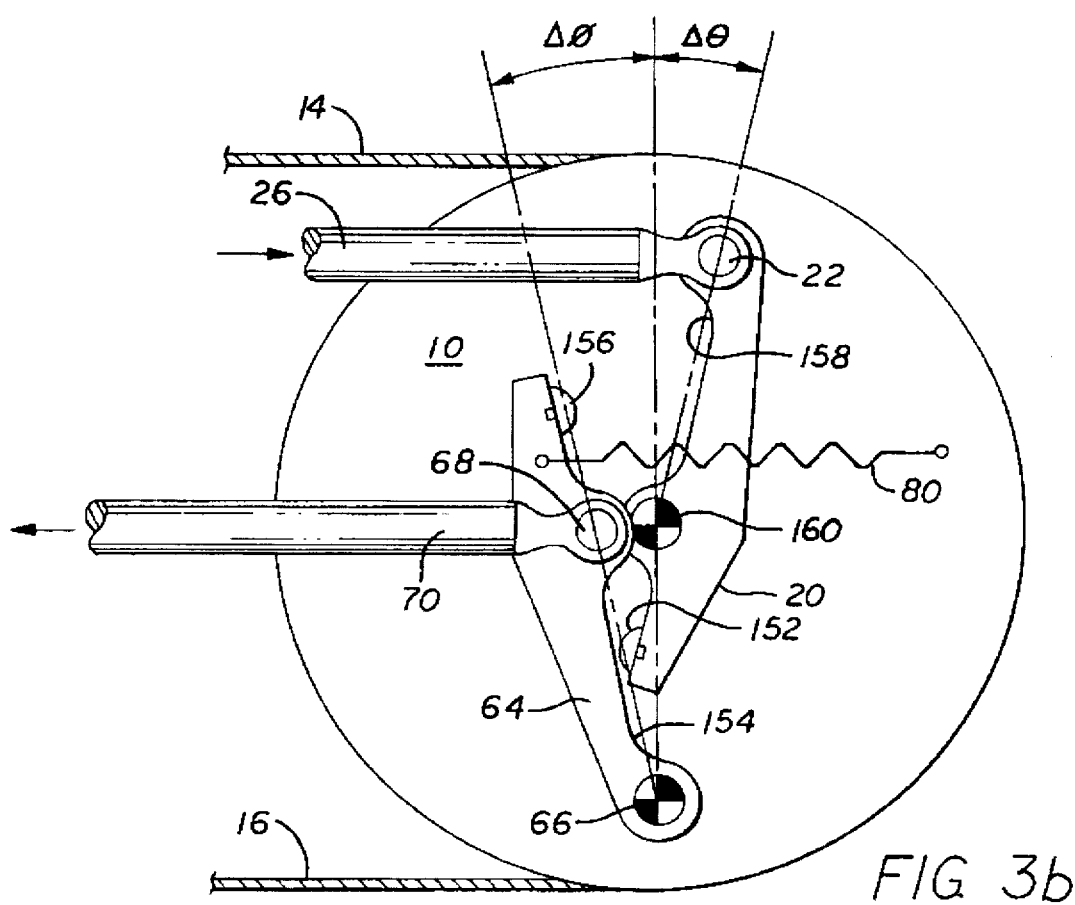

FIGS. 3(a) and 3(b) are side elevation views of the differential motion sensing mechanism 18 of the invention. Alternative configurations of the essential elements, responsive to command and linkage motion inputs for powered ("normal mode") and manual ("failure mode") operation respectively of the elevator control surfaces, are shown. As will become apparent from the discussion below, the motion sensor 18 remains passive in the sense that control of the elevator surfaces is in the default condition of powered operation (shown in FIG. 3(a)) and will not be disrupted therefrom by resetting of linkages to manual operation as long as a predetermined or programmed relationship is maintained between the command and linkage motions. When the predetermined relationship is violated (indicating a failure mode), the configuration of FIG. 3(b) is then automatically assumed. In this configuration, the differential motion sensor 18 sets various mechanical and hydraulic operations into action that redirect the system, causing the supply of hydraulic fluid for powering the elevator control surfaces to be shut off and unlocking the manual linkage 82. These actions switch elevator control from powered to manual operation. As mentioned earlier, this change is indicated at the cockpit control panel by a two-position switch.

Returning to FIG. 3(a), it can be seen that the cranks 20 and 64 are of complementary designs, each being somewhat-bowed along its length. A roller 152 is pivotally engaged to an end of the crank 20 and is seated against an inner edge 154 of the crank 64. Correspondingly, a roller 156 is pivotally engaged to an end of the crank 64 and, in the configuration of FIG. 3(a), is seated against an inner edge 158 of the crank 20.

As already mentioned, the configuration of FIG. 3(a) corresponds to hydraulically-powered operation of the elevator control surfaces. When the elevator control system is functioning properly, input command motion transmitted by the cables 14 and 16 is smoothly translated into responsive powered operation of the elevator surfaces. The inputting of power to an actuator cylinder for powering the actuator piston rod 54 is controlled by the action of the spool of the control valve. The control valve is driven by forces transmitted by linkages coupled to the error link 52. The differential motion sensor 18 receives indications of the response of the powered elevator control elements to commands through the mechanical couplings of the crank 158 thereto through the power linkage 24. Accordingly, the differential motion sensor 18 continually acquires information relating the action of the actuator piston rod 54 (and, thus, operation of the actuator cylinder) and of the control valve via the forces they exert upon the summing bar 50.

The power linkage 24 engages the differential motion sensor 18 at the clevis 22 that pivotally engages the push rod 26 to an end of the control valve crank 20. As mentioned earlier, an appropriately-tensioned (preloaded) spring 80 loads the arm 64 for intimate contact with the crank 20 within a predetermined or programmed force limit (discussed below). Intimate contact between the cranks is maintained by the spring 80 as long as the action of the powered subsystem input through the push rod 26 is satisfactorily responsive to the command motion from the cables 14, 16. The preload of the spring 80 is not exceeded in that situation.

In contrast, FIG. 3(b) indicates the situation upon detection of a failure mode. Such a mode is defined a movement in the manual mechanical linkage 24 that is inconsistent with the command input motion (angular displacement of the sector 10). Unlike the configuration of FIG. 3(a), the crank 20, pivotally fixed at 160 to the center of rotation of the sector 10, undergoes an angular deflection that exceeds the angular displacement of the sector 10 by AS. This match indicates that the input motion received from the cockpit (angular displacement of the sector 10) is sufficiently out of agreement with the action of the powered elevator (force of the push rod 26) to cause the programmed force of the spring 80 for holding the cranks 20 and 64 together to be exceeded. As mentioned earlier, such a mismatch between the motions of the sector 10 and the power linkage 21 can indicate a number of significant failure modes including jamming of the spool of the control valve or of the summing bar 50 (indicating non-responsiveness of the actuator piston rod 54).

The deflection of the upper end of the crank 20, pivoted to the sector 10 at the axis of rotation 160, displaces the upper end of the crank 64. As mentioned earlier, the crank 64 is pivotally engaged to the sector 10 at the offset pivot point 66. As shown in FIG. 3(b) the resulting rotation of the crank 20 causes the roller 152 to move along the inner edge 154 of the crank 64, producing a $\Delta\phi$ leftward angular deflection of the crank 64.

As a result of the deflection of the crank 64, a leftward acting force is exerted upon the push rod 70. This is translated, through mechanisms already described, into a reorientation of the mechanical system that includes the transverse bar 74 and the linkage 78. This results in repositioning of the spools of the emergency shutoff valve 76. As mentioned earlier, the emergency shutoff valve 76 affects the operation of the power linkage 24 by controlling a downstream control valve and the manual reversion cylinder 134. Thus, when "triggered" by the programmed detection of a mismatch between the angular motion of the sector 10 and the axial motion of the push rod 70, the emergency shutoff valve 76 is enabled to switch elevator control from powered to manual operation.

Figure 4:
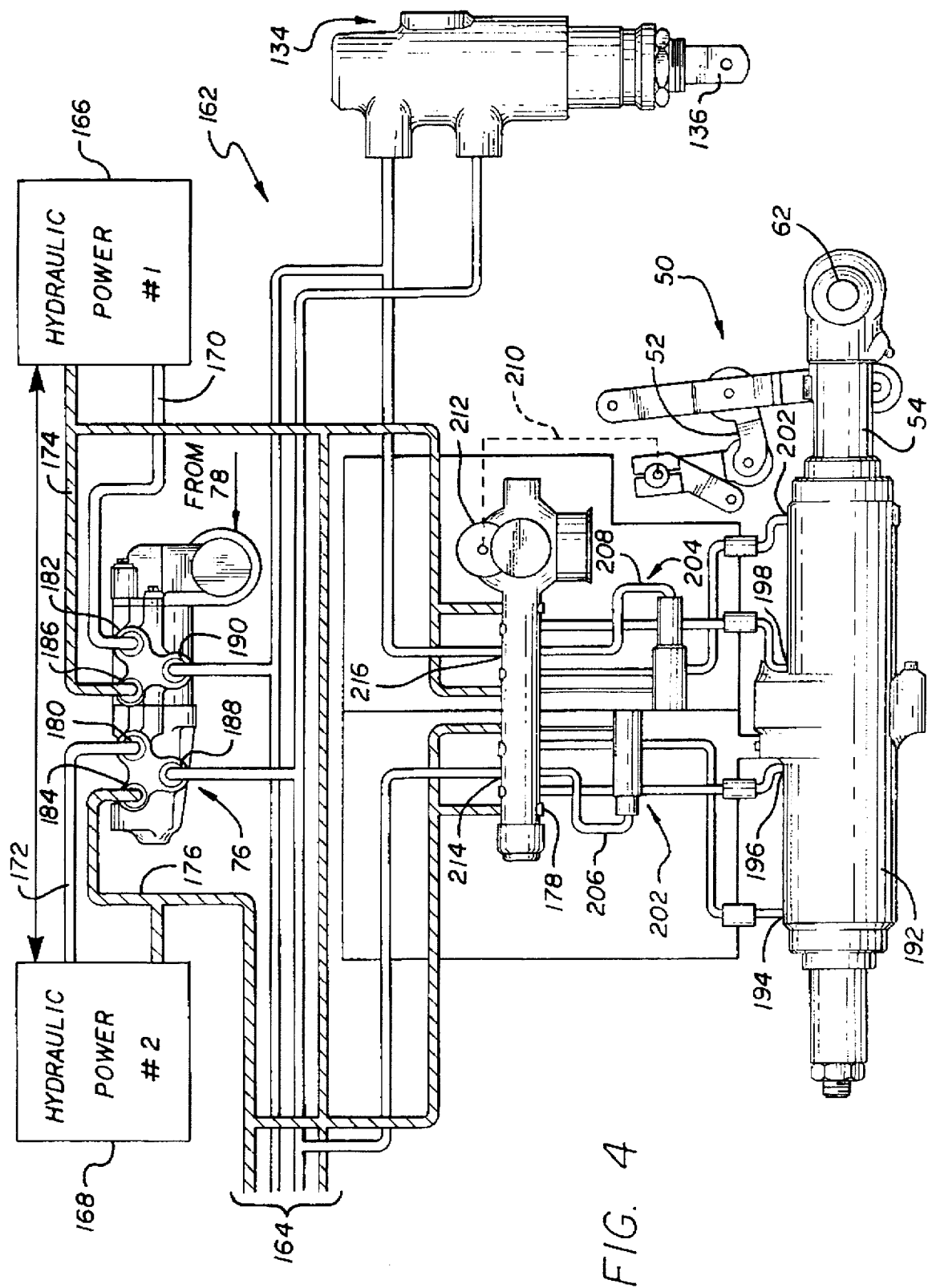
FIG. 4 is a hydraulic power diagram of the hardover protection system of the invention.

While the mechanical subsystems and linkages have been discussed above, various hydraulic links and elements, some already referred to, are required to "complete the loop" of the hardover protection system. FIG. 4 is a hydraulic power diagram of the system. In particular, this figure illustrates the elements of an elevator power control unit ("EPCU") 162 for controlling the elevator surfaces at one side of an aircraft. A similar system is provided for controlling the elevator surfaces at the opposite side. The two systems are interconnected as indicated at 164 so that emergency shutoff valve 76 will simultaneously affect a switchover from powered to manual operation for elevator surfaces at both sides of the aircraft.

Each EPCU communicates with aircraft's redundant hydraulic power supplies 166 and 168 through the emergency shutoff valve 76. The power supplies 166 and 168 are designed to provide hydraulic fluid at 1500 p.s.i. at output lines 170 and 172 respectively. Return lines 174 and 176 to the power supplies are maintained at 80 p.s.i. for pressure equalization within the closed hydraulic system. The hydraulic power supplies 166 and 168 are interlinked as indicated at 178 to provide sufficient force to actuate the hydraulic elements discussed below. Thus, should one of the supplies 166, 168 fail, the other will then provide the necessary 3000 p.s.i. for powering the downstream hydraulic mechanisms as the essential hydraulic elements possess tandem or dual configurations whereby twin chambers receive inputs from both of the hydraulic power supplies 166 and 168. Such configurations provide distinct areas for the two pressure inputs to act against, generate mechanical force. When one supply fails, the input pressure will then act against only one-half of the surface area provided by such an element. To counteract this, the power supplies 166 and 168 are interconnected so that the pressure of the output from one of the supplies is doubled when the other supply experiences a failure. In this way, the force generated by the hydraulic pressure input to a tandem hydraulic element will not be affected by the failure of one of the power supplies 166 or 168.

The emergency shutoff valve 76 is positioned between the power supplies 166, 168 and the hydraulically-operable elements, discussed below, that enable the powered operation of the elevator control surfaces. The valve 76 is mechanically coupled to the linkage 78 which, in turn, receives a mechanical input from the differential motion sensor 18. As it will be seen, the valve 76 is arranged so that, in response to an input from the differential motion sensor 18 (indicative, for example, of jamming of the spool of the tandem control valve 178) the shutoff valve 76 will disengage the remainder of the EPCU 162 from the pressure outputs of the supplies 166 and 168.

The pressure lines 172 and 174 are coupled to pressure ports 180 and 182 of the emergency shutoff valve 76 respectively. Ports 184 and 186 of the valve 76 are coupled to the low pressure return lines 176 and 174 while output ports 188 and 190 communicate with downstream hydraulic elements of the EPCU 162.

The pressure outputs of the emergency shutoff valve 72 are provided as inputs to the tandem control valve 178 and to the manual reversion cylinder 134. The control valve 178 is a spool-type valve that regulates the direction of flow of pressurized hydraulic fluid into a tandem-configured actuator cylinder 192. The control valve 178 selectively admits pressurized hydraulic fluid into chambers of the cylinder 192. The control valve 178, a three position valve with "through", "off" and "cross" settings introduces pressurized hydraulic fluid into opposed sides of internal chambers, each separated by a piston affixed to the actuator piston rod 54 to drive the piston rod 54 axially with respect to the actuator cylinder 192. As mentioned earlier, the joint 62 at the free end of the piston rod 54 is mechanically engaged to the horn of the elevator so that the attitude of such elevator is responsive thereto.

Tandem pairs of actuator cylinder ports 194, 196 and 198, 200 receive pressure outputs from the control valve 78. In each pair, one input port of the actuator cylinder 192 communicates with the chamber at one side of the piston while the other port communicates with that at the other side. By-pass valves 202 and 204 are located between the output ports of the tandem control valve 178 and the paired input ports 194, 196 and 198, 200 of the actuator cylinder 192. Each of the by-pass valves 202 and 204 is arranged to interconnect one pair of ports of the actuator cylinder 192 when the pressure is cut off to the actuator cylinder 192. This allows the actuator piston rod 54 to move freely. When this occurs, aerodynamic forces position the attitude of the elevator surface in response to the control tab 84.

A line 206 receives an output from the tandem control valve 178 that controls the position of the spring-loaded spool of the by-pass valve 202 and a line 208 similarly provides a hydraulic input to the by-pass valve 204 for positioning its spring-loaded internal spool.

Mechanical feedback is provided between the actuator piston rod 54 and the tandem control valve 178 to assure smooth movement of the elevator control surfaces. The mechanical linkages for affecting such mechanical feedback are partially illustrated in FIG. 4. As can be seen, the summing bar 50, which is coupled to the actuator piston rod 54 is also connected to the error link 52. Additional mechanical linkages are indicated symbolically by the numeral 210. Such linkages complete the feedback to a spool positioning mechanism 212 of the control valve 178. The spool positioning mechanism 212 controls the position of the spool of the tandem control valve 178 relative to the input and output ports thereof to regulate the flow of hydraulic fluid into the pairs of ports 194, 196 and 198, 200 of the actuator cylinder 192. As mentioned earlier, command motion from the cockpit is translated, through the power linkage 24 into motion of the summing bar 50. The combined influences of the command input and actuator piston rod 54 motions result in movement of the summing bar 50 that is translated, through the described mechanical linkages, to the spool positioning mechanism 212.

The tandem input ports of the manual reversion cylinder 134 communicate with the output ports 188 and 190 of the emergency shutoff valve 76. The cylinder 134 includes dual internal chambers to accommodate shutoff valve 76 outputs at 1,500 p.s.i. from both ports or of 3,000 p.s.i. from one port. The end of the piston 136 is coupled to the crank 138 (not shown in FIG. 4). As discussed with reference to FIGS. 1, 2(a) and 2(b), the crank 138 is pivoted, reacting to the holddown force of a spring 144, to exert a compressive force at the end of the piston 136. When pressure is removed from both input ports of the manual reversion cylinder 134, the piston 136 will retract under the spring force. Such retraction of the piston 136 of the manual reversion cylinder 134 unlocks the manual linkage 82 to permit manual control of the elevator surfaces.

Due to the interposition of the emergency shutoff valve 76 between the hydraulic power sources 166, 168 and the other elements of the EPCU 162 (and of the like EPCU for controlling elevator surfaces at the other side of the aircraft), the inputs to both the manual reversion cylinder 134 and the tandem control valve 178 are simultaneously affected by actuation of the emergency shutoff valve 76. The piston 136 of the manual reversion cylinder 134 is extended to lock the manual linkage 82, by the force generated by either 3,000 p.s.i. in one chamber of the cylinder 134 or 1,5000 p.s.i. in both of its chambers. At the same time, like hydraulic inputs are delivered to input ports 214 and 216 of the tandem control valve 178 for selective feeding to the chambers of the actuator cylinder 192. This, of course, directs axial movement of actuator piston rod 54 to thereby provide powered operation of the elevator surfaces.

On the other hand, when the emergency shutoff valve 76 disrupts the pressurized flow of hydraulic fluid to the dual ports 214 and 216 of the tandem control valve 178, the by-pass valves 202 and 204 function to tie the pairs of ports 194, 196 and 198, 200 of the actuator cylinder 192 together. This permits the actuator piston 54 (and joint 62 for engaging the horn of the elevator surface) to move freely in response to aerodynamic forces generated by the now manually operable elevator control tab 84. Thus, powered operation of the elevator surfaces occurs as long as the emergency shutoff valve 76 does not disrupt the pressurized flow of hydraulic fluid to the control valve 178 and to the manual reversion cylinder 134. When such flow is interrupted however, the piston 136 of the manual reversion cylinder 134 retracts under the force of the spring 144, unlocking the manual linkage 82, and the various input ports of the actuator cylinder 192 are interconnected, permitting the elevator surfaces to move freely in response to aerodynamic forces generated through manual positioning of the control tab 84.

Figures 5, 6:
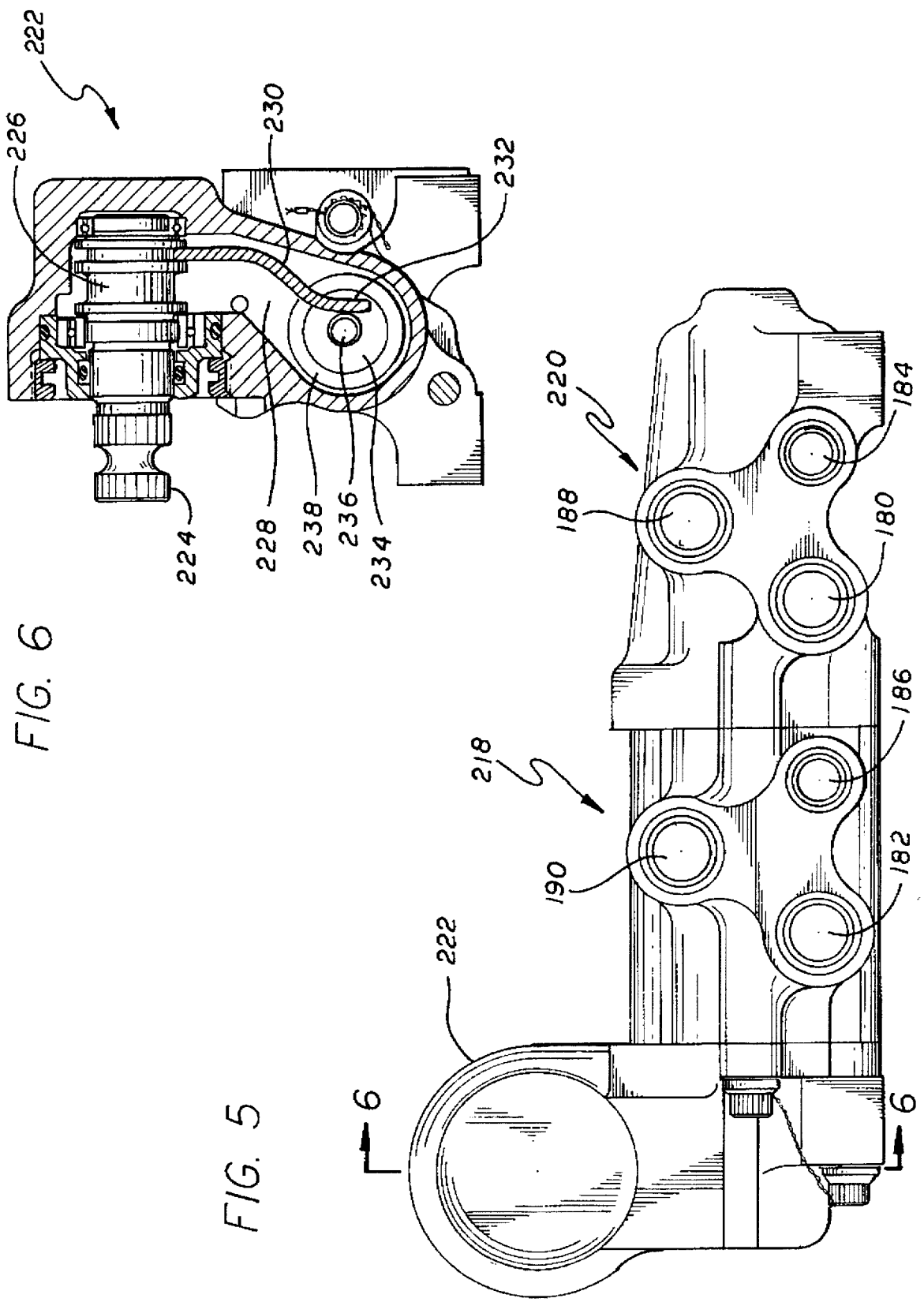
FIG. 5 is a side elevation view of the emergency shutoff valve of the hardover protection system of the invention.
FIG. 6 is a cross sectional view of the emergency shutoff valve taken at line 6—6 of FIG. 5.
Figure 7A:
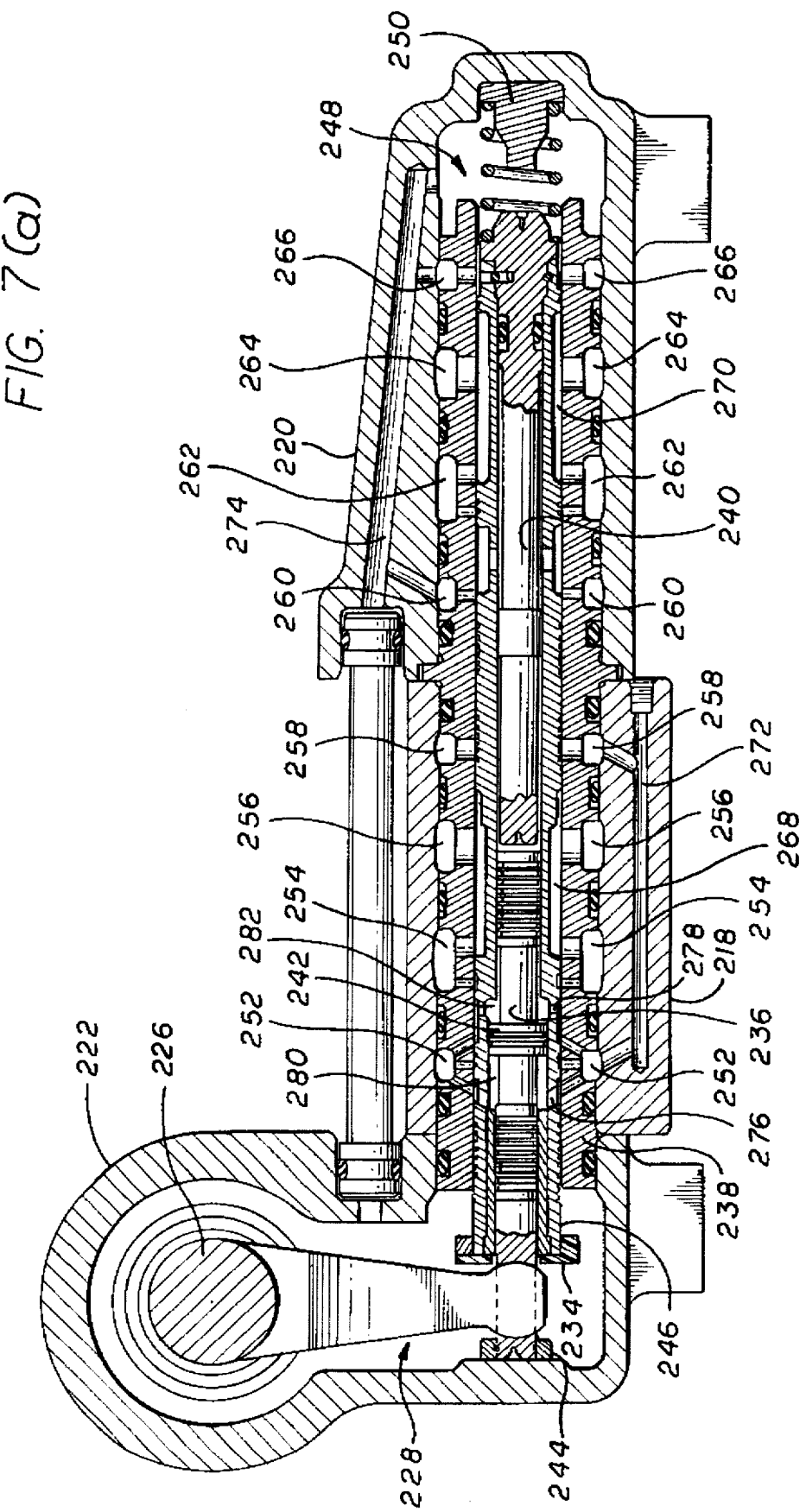
FIGS. 7(a), 7(b) and 7(c) are longitudinal sectional views of the emergency shutoff valve illustrating its various configurations of operation.
Figure 7B:
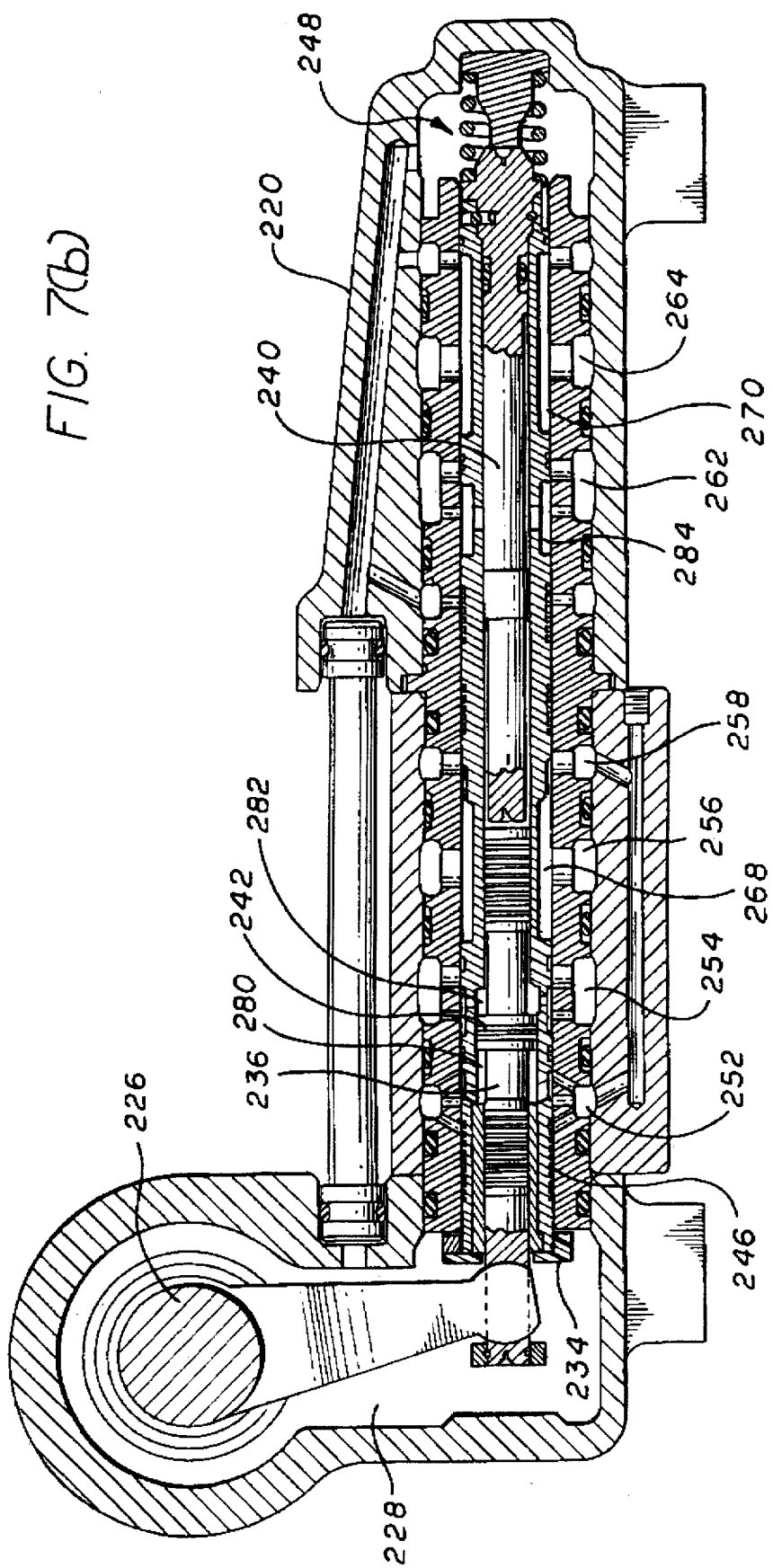
Figure 7C:
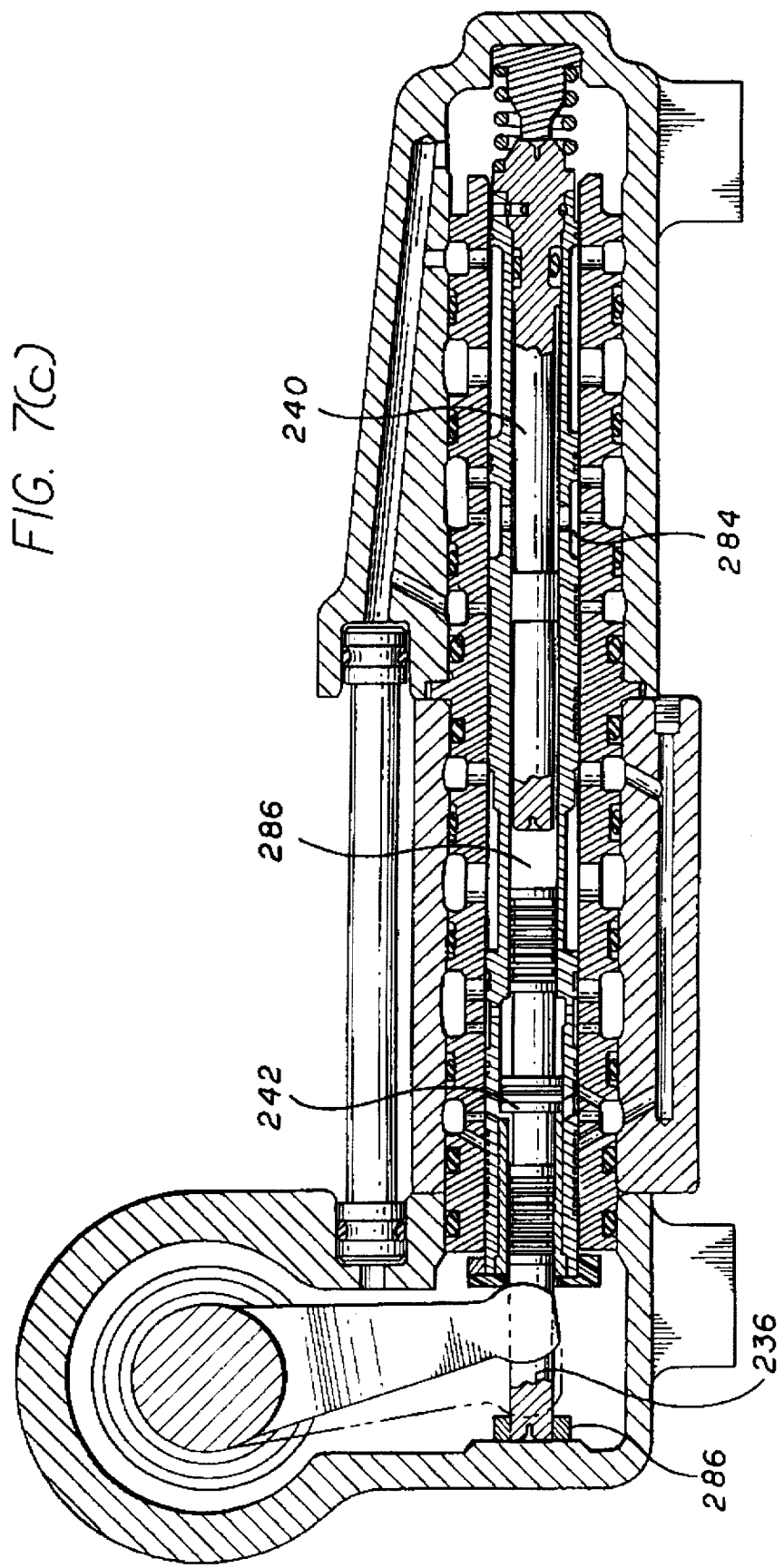

FIG. 5 is a side elevation view of the emergency shutoff valve 76 for illustrating the arrangement of ports thereof. Such ports provide communication between the valve 76, the outputs of the hydraulic power supplies 166, 168 and the inputs to the control valve 178 and the manual reversion cylinder 134. This view will assist understanding of the internal operation of the valve as illustrated in FIGS. 7(a) through 7(c) below.

As can be seen in FIG. 5, the housing of emergency shutoff valve 76 is sub-divided into two regions of valve ports. A rear region 218 set of ports includes the port 182 that communicates with the pressure line 170 of the hydraulic power supply 166, the (smaller) port 186 that communicates with the return line 174 and the output port 190 that, of course, communicates both with a chamber of the tandem control valve 178 and one of the manual reversion cylinder 134. The front 220 of the valve housing includes a set of three ports that includes the port 180 that communicates with the pressure line 172 of the second hydraulic power supply 168, the port 184 that communicates with the return line 176 and the output port 188 that again communicates with the tandem control valve 178 and with the manual reversion cylinder 134.

FIG. 6 is a cross-sectional view of the emergency shutoff valve 76 taken at line 6—6 of FIG. 5. In particular, this view illustrates the arrangement of the crankshaft portion 222 of the valve housing. A knob 224 at the side of the crankshaft portion 222 is fixed to and coaxial with a shaft 226 therein. An arm 228 is, in turn, fixed to the shaft 226 whereby rotation of the shaft 226 results in angular displacement of the arm 228 (into and out of the plane of the paper).

The arm 228 includes a transverse bend 230 whereby the lower end 232 thereof is aligned with a shim 234. It will be shown in figures that follow that the shim 234 is fixed to the end of an internal spool of the emergency shutoff valve 76 and slidable therewith. The bend 230 allows the arm 228 to avoid contact with a spool 236 or with an outer sleeve 238. The spool 236 is coaxial and movable with respect to the internal sleeve. The knob 224 of the emergency shutoff valve 76 engages mechanisms, shown symbolically in FIG. 1 as the linkage 78, that are mechanically coupled to the differential motion sensor 18. The details of the mechanical elements comprising the linkage 78 and their manner of coupling to the knob 224 are not essential to an understanding of the invention as such couplings and linkages are well known and appreciated by those skilled in the art.

FIGS. 7(a), 7(b) and 7(c) are longitudinal sectional views of the emergency shutoff valve 76 that illustrate its various operational configurations. The reader will be assisted in understanding such operation by reference to preceding FIGS. 5 and 6. Referring first to FIG. 7(a), the emergency shutoff valve 76 is shown in its "normal" configuration whereby the pressure outputs of the hydraulic power supplies 166 and 168 are passed through the valve 76 to both the tandem control valve 178 and the manual reversion cylinder 134.

The housing sections 218, 220 and 222, when assembled, comprise an elongated central cavity that accommodates the spool 236 and a plug 240 coaxial therewith. The spool 236 includes an enlarged diameter spool land 242. A washer 244 is secured to the rear end of the spool 236 as shown.

A pair of sleeves surround, and are coaxial with, the aligned spool 236 and plug 240. An inner sleeve 246 includes a plurality of annular passageways and ports whose functions will be described below while the outer sleeve 238 includes a number of annular reservoirs and ports for hydraulic communication between the ports of the emergency shutoff valve 76 and the ports and annular passageways of the inner sleeve 246.

The shim 234 is fixed to the rear of the inner sleeve 246 as shown. As mentioned earlier, the arm 228, which is activated by rotation of the shaft 226, comprises a bent configuration whose lower end 232 is aligned to impact the shim 234 while avoiding contact with the spool 236. A spring 248 is seated upon a guide 250 at the tip of the front portion 220 of the valve housing. The spring 248 spans the distance between the guide 250 and the front end of the plug 240.

Various elements of the emergency shutoff valve 76, including the spool 236, plug 240 and the inner sleeve 246, are slidable within the housing to affect changes at the output ports 188 and 190. Such movements occur in stages. The first stage is caused by rotation of the arm 228 and shaft 226 in response to a mechanical input from the differential motion sensor 18 via the linkage 78. The first stage of movement produces some change in the axial position of the inner sleeve 246. In the event that the amount of movement exceeds a predetermined limit, important fluid flow channels will be reconfigured within the valve 76. This reconfiguration leads to a second stage, hydraulic pressure actuated, in which additional movement occurs that fully ports the valve 76. Thereafter, the valve will be held in a shutoff position by pressure from either or both of the hydraulic supplies 166 and 168. To reset the emergency shutoff valve 76, such pressure must be dumped to return, allowing the spring 248 to return the plug 240 to the normal operating position illustrated in FIG. 6(a).

Referring to FIG. 7(a) with reference to the port locations as shown in FIG. 5, a plurality of annular passageways 252, 254, 256, 258, 260, 262, 264 and 266 is located at the outer periphery of the outer sleeve 238. By aligning such passageways with the ports as shown in FIG. 5, it can be seen that the passageway 254 communicates with the pressure port 182, the passageway 256 communicates with the output port 190 and the passageway 258 communicates with the return port 186 of the hydraulic power supply 166. Similarly, the annular passageway 262 communicates with the pressure port 180, the passageway 264 communicates with the output port 188 and the passageway 266 communicates with the return port 184 of the hydraulic power supply 168.

Small ports associated with the above-described circular passageways provide communication with cutout portions of the peripheral surface of the inner sleeve 246. Thus, in the normal operational mode of FIG. 7(a), a cutout 268 provides hydraulic communication between the pressure port 182 (through the annular passageway 254) and the output port 270 (through the annular passageway 256). Similarly, a cutout 270 provides fluid communication between the pressure port 180 (via the annular passageway 262) and the output port 188 (via the annular passageway 264). It is also noted that, in the normal position, corresponding annular passageways 252 and 260 are hydraulically connected to the return ports 186 and 184 respectively. In the first case, such connection is made through a lower channel 272 that interconnects the annular passageways 252 and 258 while, in the latter case, pressure equalization is achieved by means of an upper passageway 274 that connects the annular passageways 260 and 266. In the normal mode, a system of small ports, as shown, provides fluid communication between the annular passageway 252, the ports 276 and 278 of the inner sleeve 246 and reservoirs 280 and 282 at either side of the spool land 242. Accordingly, in the normal mode, equal and opposite forces act on the opposed sides of the spool land 242.

FIG. 7(b) illustrates the configuration of the emergency shutoff valve 76 upon detection of a mismatch between input and output motions at the differential motion sensor 18. In response, the shaft 226 of the valve 76 is caused to rotate. The rotation of the shaft 226 produces an angular displacement of the lower end 232 of the arm 228. A small displacement (less than 0.60 inches) of the lower end 232 due, for example, to environmental vibration, can occur without triggering the emergency shutoff valve 76 to port. This tolerance is built into the valve 76 through the relative locations of the ports and annular passageways discussed above along with the small clearance between the lower end 232 and the shim 234.

Upon rotation of the arm 228 by an amount sufficient to impact the shim 234, the assembly including the inner sleeve 246 is displaced toward the right as shown in FIG. 7(b). The spool 236 and the plug 240 are pulled along and the spring 248 in the front portion 220 of the valve housing is somewhat compressed.

The aforesaid displacements produce a number of effects. As noted from FIG. 7(b), the rightward movement of the cutout 268 of the inner sleeve 246 disconnects the circular passageway 256 from the annular passageway 254 and, in its place, connects it to the annular passageway 258. This, in effect, terminates communication between the output port 190 and the pressure port 182 that is connected to the hydraulic supply 166 and re-connects the output port 190 to the return port 186. Similarly, the rightward movement of the inner sleeve 246 displaces the cutout 270 so that the annular passageway 262 will no longer be in communication with the annular passageway 264. Rather, the passageway 264 will now be connected to the passageway 266. As a consequence, the normal mode's flow of fluid (from the high pressure port 180 to the output port 188) is terminated and replaced with the connection of the output port 188 to the 80 p.s.i. return port 184. The axial position of the plug 240 is held by the radial, inwardly-acting force exerted upon the inner sleeve 246 (to which the plug 240 is fixed) by the force of 1500 p.s.i. acting against a cutout 284 that has been displaced to now communicate with the annular passageway 262.

The configuration of FIG. 7(b) only exists momentarily. The rightward movement of the spool 236, along with the inner sleeve 246, disrupts the former simultaneous fluid communication between the annular passageway 252 and the reservoirs 280 and 282 on opposite sides of the spool land 242. Furthermore, while the 80 p.s.i. hydraulic pressure at the annular passageway 252 continues to communicate with the reservoir 280 to the left of the spool land 242, the passageway 254, in communication with a 1500 p.s.i. (or 3000 p.s.i.) port, now communicates with the reservoir 282 to the right of the spool land 242. This pressure imbalance results in a net force acting to the left against the spool land 242.

FIG. 7(c) illustrates the full port configuration of the emergency shutoff valve 76 that follows the first stage displacement of FIG. 7(b). The pressure differential created at the opposed sides of the spool land 242 drives the spool 236 to the left so that a washer 286 fixed to the rear end of the spool 236 now abuts the rear of the valve housing. As mentioned earlier, the plug 240 is held in the position of FIG. 7(b) by high pressure from port 180 that acts radially against the cutout 284. Accordingly, the separation 286 between the proximate ends of the spool 236 and the plug 240 is increased. The continuing pressure differential between the sides of the spool land 242 maintains the full port position of the spool 236. Accordingly, the configuration shown in FIG. 7(c) will continue, resulting in the cutoff of pressure to both the control valve 178 and the manual reversion cylinder 134. As mentioned earlier, this will be maintained, keeping the elevator surfaces under manual control until the emergency shutoff valve 76 is reset.

Thus it is seen that the present invention provides a hardover protection system in which mechanical and hydraulic elements interact to detect and act upon predetermined failure mode indications relating to powered operation of the aircraft's elevator surfaces and to switch control thereof to manual. In addition to detecting a failure of the powered system, the invention acts to disable elements of the hydraulically powered system so that manual control process can come on-line.

While this invention has been described with reference to its presently preferred embodiment, it is not limited thereto. Rather, the invention is limited only insofar as defined by the following set of the patent claims and includes all equivalents within its scope.

What is claimed is:

1. Apparatus for controlling the pitch of an aircraft elevator surface comprising, in combination:

a) a cable comprising a pair of cable segments for inputting a pitch command;

b) a disk-like sector having a grooved periphery for receiving said cable segments so that the angular orientation of said sector is responsive to said pitch command;

c) means for hydraulically adjusting said pitch of said elevator surface;

d) a power linkage coupled to said sector for actuating said means in response to a change in the angular orientation of said sector;

e) a manual linkage coupled to said sector for mechanically adjusting the attitude of a control tab in response to a change in the angular orientation of said sector;

f) means engaged to said sector and to said power linkage for monitoring the relationship between said pitch command and power linkage motions;

g) said last-named means further including means for disabling said means for hydraulically adjusting said pitch in accordance with the relationship between said pitch command and power linkage motion; and h) means, coupled to said last-named means, for locking said manual linkage when said relationship falls within predetermined limits and for unlocking said manual linkage when said relationship exceeds said predetermined limits whereby the attitude of said control tab is then responsive to the angular orientation of said sector.

2. Apparatus as defined in claim 1 wherein said means for monitoring said relationship further includes:

a) a first crank, said first crank being coupled to said means for disabling;

b) a second crank, said second crank being coupled to said power linkage; and c) a spring for urging said first crank into contact with said second crank.

3. Apparatus as defined in claim 2 further characterized in that:

a) said spring is fixed to said sector and to said first crank; and b) said spring is arranged to provide a force for maintaining said first crank substantially in contact with said second crank provided that said predetermined limit is not exceeded.

4. Apparatus as defined in claim 3 further characterized in that:

a) said second crank is pivotally fixed to the axis of rotation of said sector; and b) said first crank is pivotally fixed to said sector at a distance removed from the axis of rotation of said sector.

5. Apparatus as defined in claim 4 further characterized in that said first crank is coupled to said means for disabling at the axis of rotation of said sector when said predetermined limit is not exceed.

6. Apparatus as defined in claim 5 wherein said second crank is coupled to said power linkage at a distance removed from the axis of rotation of said sector.

7. Apparatus as defined in claim 6 further including:

a) a roller pivotally joined to a free end of said second crank; and b) said first and second cranks are arranged so that said roller contacts an edge of said first crank whereby the position of said free end of said second crank is responsive to deflection of said first crank.

8. Apparatus as defined in claim 2 wherein said means for disabling further includes:

a) a shutoff mechanical linkage;

b) an emergency shutoff valve, said valve being coupled to said shutoff mechanical linkage; and c) said shutoff mechanical linkage being coupled to both said first crank and said shutoff valve is responsive to deflection of said first crank.

9. Apparatus as defined in claim 8 further characterized in that:

a) said power linkage is coupled to a control valve for controlling said means for hydraulically adjusting;

b) said means for locking and unlocking includes a manual reversion cylinder; and c) said emergency shutoff valve is hydraulically coupled to said control valve and to said manual reversion cylinder and arranged so that, in response to a predetermined input from said shutoff linkage, said emergency shutoff valve cuts off hydraulic pressure to both said control valve and said manual reversion cylinder.

10. Apparatus as defined in claim 9 further characterized in that:

a) said manual linkage includes an inner linkage for receiving motion from said sector and an outer linkage for applying motion to said control tab;

b) said means for locking includes means for moving said outer linkage between a first position and a second position relative to said inner linkage; and c) said outer linkage is responsive to said inner linkage in said second position and is not responsive to said inner linkage in said first position.

11. Apparatus as defined in claim 10 further characterized in that;

a) said inner linkage includes a first tube;

b) said outer linkage includes a second tube; and c) said first and second tubes are in axial alignment when said outer linkage is in said first position.

12. Apparatus as defined in claim 11 wherein said means for locking further includes a locking linkage that is responsive to said manual reversion cylinder.

13. Apparatus as defined in claim 12 wherein said locking linkage includes a spring arranged to exert a predetermined retraction force upon the piston of said cylinder.

14. Apparatus as defined in claim 13 wherein said locking linkage is arranged to lower the axis of said second tube below that of said first tube when the piston of said manual reversion cylinder is retracted by the force of said spring.

15. Apparatus as defined in claim 9 wherein said emergency shutoff valve includes at least one input port adapted to receive hydraulic pressure from at least one hydraulic power supply and at least one return port.

16. Apparatus as defined in claim 15 wherein said emergency shutoff valve includes at least one output port, said port being in hydraulic communication with at least one input port of said control valve and with at least one input port of said manual reversion cylinder.

17. Apparatus as defined in claim 16 further characterized in that:

a) said control valve includes means for positioning a control valve spool; and b) said means for positioning is coupled to said power linkage.

18. Apparatus as defined in claim 17 further including:

a) a feedback linkage responsive to the pitch of said aircraft elevator surface; and b) said feedback linkage is engaged to said power linkage.

19. Apparatus as defined in claim 18 wherein said emergency shutoff valve includes two input ports, each of said ports being adapted to receive hydraulic pressure output from a hydraulic power supply.

20. Apparatus as defined in claim 18 further characterized in that:

a) said control valve comprises a tandem configuration including two input ports;

b) said manual reversion cylinder comprises a tandem configuration including two input ports;

c) said emergency shutoff valve includes two output ports; and d) said output ports of said emergency shutoff valve are in hydraulic communication with said input ports of said control valve and with said input ports of said manual reversion cylinder.

21. Apparatus as defined in claim 18 wherein said emergency shutoff valve further includes:
   a) an arm;
   b) said arm being rotatably engaged to said shutoff mechanical linkage and arranged so that the position of the free end thereof is displaced in response to movement of said shutoff mechanical linkage; and
   c) means responsive to the position of the free end of said arm for selectively ordering the flow of hydraulic fluid through said valve whereby fluid flow through said emergency shutoff valve is responsive to movement of said shutoff linkage.

22. Apparatus as defined in claim 21 wherein said means for selectively ordering the flow of hydraulic fluid through said emergency shutoff valve further includes:
   a) an outer valve sleeve, said sleeve having a plurality of cutouts at its outer periphery for forming annular fluid passageways and a plurality of annular ports for communicating between said passageways and the interior of said valve;
   b) an inner valve sleeve nested within said outer sleeve and movable with respect thereto, said inner sleeve having a plurality of cutouts at its outer periphery for forming annular fluid passageways and a plurality of annular ports for communicating between said passageways and the interior of said valve; and
   c) said inner and outer sleeves being arranged so that, in response to a predetermined amount of displacement of said inner sleeve, said emergency shutoff valve blocks the transfer of hydraulic pressure from said input port to said output port.

23. Apparatus as defined in claim 22 wherein said emergency shutoff valve further includes:
   a) a first elongated member located within and coaxial with said inner sleeve;
   b) a second elongated member located within coaxial with said inner sleeve; and
   c) said first and second elongated members are positioned adjacent one another within said inner sleeve.

24. Apparatus as defined in claim 23 wherein:
   a) said first elongated member comprises a spool that includes an intermediate enlarged diameter spool land;
   b) said spool land forms a seal with the interior of said inner sleeve; and
   c) said inner sleeve and said spool land are arranged to form hydraulic fluid reservoirs on either side of said spool land.

* * * * *